US012617071B2

(12) United States Patent
Tilly

(10) Patent No.: US 12,617,071 B2
(45) Date of Patent: May 5, 2026

(54) STORAGE UNIT FOR TOOLS

(71) Applicant: SW-Stahl GmbH, Remscheid (DE)

(72) Inventor: Heinrich Tilly, Brilon (DE)

(73) Assignee: SW-STAHL GMBH, Remscheid (DE)

( * ) Notice: Subject to any disclaimer, the term of this patent is extended or adjusted under 35 U.S.C. 154(b) by 236 days.

(21) Appl. No.: 17/641,832

(22) PCT Filed: Sep. 9, 2020

(86) PCT No.: PCT/DE2020/200074
§ 371 (c)(1),
(2) Date: Mar. 10, 2022

(87) PCT Pub. No.: WO2021/047742
PCT Pub. Date: Mar. 18, 2021

(65) Prior Publication Data

US 2022/0402114 A1 Dec. 22, 2022

(30) Foreign Application Priority Data

Sep. 10, 2019 (DE) ........................ 102019006380.5

(51) Int. Cl.
*E05B 65/46* (2017.01)
*A47B 88/423* (2017.01)
*B25H 3/02* (2006.01)

(52) U.S. Cl.
CPC ........... *B25H 3/028* (2013.01); *A47B 88/423* (2017.01); *E05B 65/46* (2013.01)

(58) Field of Classification Search
CPC ........ A47B 88/423; B25H 3/028; E05B 65/46
USPC ................................ 312/216, 220, 221, 219
See application file for complete search history.

(56) References Cited

U.S. PATENT DOCUMENTS

| | | | | | |
|---|---|---|---|---|---|
| 1,353,974 | A * | 9/1920 | Smith | A47B 61/003 | 49/70 |
| 2,886,392 | A * | 5/1959 | Stegmaier | E05B 65/462 | 292/196 |
| 3,070,340 | A * | 12/1962 | Cohn | A47B 21/045 | 312/226 |
| 3,404,929 | A * | 10/1968 | Wright | E05B 65/463 | 312/216 |
| 3,893,740 | A * | 7/1975 | England | E05B 65/467 | 312/216 |
| 4,429,930 | A * | 2/1984 | Blouin | E05B 65/463 | 312/107.5 |
| 4,438,606 | A * | 3/1984 | Chardon | E04H 6/005 | 109/51 |

(Continued)

FOREIGN PATENT DOCUMENTS

| | | |
|---|---|---|
| DE | 202005018504 U1 | 3/2006 |
| DE | 202018100948 U1 | 7/2019 |
| GB | 2480322 A | 11/2011 |

*Primary Examiner* — James O Hansen

(57) ABSTRACT

A storage unit, in particular a tool and gear wagon 1, for storing tools, comprising at least one body 2 with several pull-out drawers 4 which can be arrested via at least one locking unit 40 such that, when any one of the drawers 4 is pulled out, the other drawers 4 are blocked. In order to be able to pull out several drawers and preferably adjust them individually, it is provided for the locking unit to have an adjustment element which ensures the function of locking in a first position, and in a second position, the release of at least more than one drawer is provided.

11 Claims, 12 Drawing Sheets

(56) References Cited

U.S. PATENT DOCUMENTS

| | | | | | |
|---|---|---|---|---|---|
| 4,452,498 | A * | 6/1984 | Wood, Jr. | E05B 65/465 | 312/220 |
| 4,732,434 | A * | 3/1988 | Hartrum | E05B 65/464 | 312/217 |
| 4,770,476 | A * | 9/1988 | Lakso | E05B 65/464 | 312/220 |
| 4,925,257 | A * | 5/1990 | Frederiksen | E05B 65/463 | 312/221 |
| 4,936,640 | A * | 6/1990 | Pratzer | E05B 65/464 | 312/221 |
| 5,605,388 | A * | 2/1997 | Laakso | E05B 65/465 | 312/216 |
| 5,829,859 | A * | 11/1998 | Cram | E05B 65/464 | 312/283 |
| 6,082,839 | A * | 7/2000 | Chiku | E05B 65/463 | 312/219 |
| 6,170,927 | B1 * | 1/2001 | Dykstra | E05B 65/466 | 312/220 |
| 6,378,963 | B1 * | 4/2002 | Relyea | B60B 33/025 | 312/351.13 |
| 6,409,290 | B1 * | 6/2002 | Lin | E05B 65/462 | 312/219 |
| 6,634,726 | B1 * | 10/2003 | Slivon | E05B 65/463 | 312/217 |
| 6,722,749 | B1 * | 4/2004 | Pagac | E05B 65/463 | 312/221 |
| 7,309,114 | B2 * | 12/2007 | Lin | B25H 3/028 | 312/334.44 |
| 7,540,573 | B2 * | 6/2009 | Lin | E05B 65/463 | 312/220 |
| 7,946,663 | B2 * | 5/2011 | Holcomb | E05B 65/46 | 312/217 |
| 8,651,591 | B1 * | 2/2014 | Chen | E05B 65/462 | 312/218 |
| 8,696,074 | B2 * | 4/2014 | Romaen | E05B 65/464 | 312/215 |
| 8,899,699 | B2 * | 12/2014 | Fulterer | A47B 88/477 | 312/217 |
| 10,405,655 | B2 * | 9/2019 | Nelson | E05B 65/466 | |
| 2006/0125357 | A1 * | 6/2006 | Ludwig | E05B 65/464 | 312/221 |
| 2006/0186776 | A1 | 8/2006 | Tsai | | |
| 2007/0283733 | A1 | 12/2007 | Ratkus | | |
| 2010/0295433 | A1 * | 11/2010 | Randall | E05B 65/466 | 312/333 |
| 2011/0187248 | A1 * | 8/2011 | Kao | A47B 81/00 | 312/280 |
| 2012/0126674 | A1 | 5/2012 | Wang | | |
| 2014/0167575 | A1 * | 6/2014 | Freimuth | E05B 65/462 | 312/220 |

* cited by examiner

STORAGE UNIT FOR TOOLS

CROSS REFERENCE TO RELATED APPLICATIONS

This application is the U.S. national stage of International Application No. PCT/DE2020/200074, filed on Sep. 9, 2020. The international application claims the priority of DE 102019006380.5 filed on Sep. 10, 2019; all applications are incorporated by reference herein in their entirety.

BACKGROUND

The invention relates to a storage unit, in particular a tool and gear wagon for storing tools, comprising at least one body with a plurality of pull-out drawers which can be arrested via at least one locking unit such that, when any one of the drawers is pulled out, the other drawers are blocked.

Storage units for tools can consist, for example, of tool and gear wagons, but also of stationary tool cabinets which are usually employed in the professional field, e. g. in a car repair shop or a manufacturing line, for example in the final assembly or repair of passenger cars or lorries. This, however, does not exclude a use in the private field. Here, in particular the tool and gear wagons can be pointed out as they are particularly often employed due to their flexibility and are used here to receive a plurality of hand tools or special tools which always have to be conveniently available and are present in an optically attractive and sorted form, so that not much time is spent on searching a certain tool. For this reason, the tool and gear wagons are fitted with several drawers which can be pulled out from a body. The drawers are here held via guiding or telescopic rails which permit to completely pull out the drawers. By this, the complete line of tools required in a workshop or a manufacturing line is always conveniently available. In particular in workshops, however, stationary tool cabinets are used instead of tool and gear wagons which are arranged directly proximate to the workplaces not only to divide the workplaces, but also to store tools.

In many cases, however, one tool drawer is not enough, and one quite often has to switch between different tools during the assembly which are located in different drawers, so that two or more drawers have to be used alternately.

The storage units known from prior art, in particular tool and gear wagons, have a locking unit that also includes, apart from the locking of the cabinet or tool and gear wagon, a catch which permits to pull out only one single drawer. As soon as one drawer has been pulled out at least partially, all other drawers are blocked. For this reason, it is very cumbersome to always have to push in the drawers to the limit stop and only then be able to pull out another drawer. The reason why such a locking unit is provided is that the range of tools can have an own weight of several kilos, and the overturning moment is thus changed when several drawers are pulled out, and the tool and gear wagon could tip over.

From German utility model DE 20 2005 018 504 U1, for example, a tool and gear wagon is known which is fitted with such a locking unit. From German utility model DE 20 2018 100 948 U1, another embodiment of a tool and gear wagon which also has a locking unit is equally known. The locking units are designed therein individually, but they always allow for only one single drawer to be pulled out, while the other drawers are simultaneously locked. Even in case the tool and gear wagon is to be cleaned, it is not possible to pull out, for example, all drawers or a major part of the drawers.

SUMMARY

The invention relates to a storage unit, in particular a tool and gear wagon 1, for storing tools, comprising at least one body 2 with several pull-out drawers 4 which can be arrested via at least one locking unit 40 such that, when any one of the drawers 4 is pulled out, the other drawers 4 are blocked. In order to be able to pull out several drawers and preferably adjust them individually, it is provided for the locking unit to have an adjustment element which ensures the function of locking in a first position, and in a second position, the release of at least more than one drawer is provided.

DETAILED DESCRIPTION

In order to eliminate the above-mentioned problems in tool cabinets or tool and gear wagons, the object underlying the present invention is to fit a storage unit with a new locking unit offering an increased flexibility when the drawers are pulled out.

To achieve this object, the locking unit has, according to the invention, an adjustment element which ensures the function of locking in a first position, and in a second position, the release of at least more than one drawer is provided. Further advantageous embodiments of the invention result from the subclaims.

In the present case, the locking unit is combined with an adjustment element which ensures the function of locking in a first position, and permits the release of at least more than one drawer in a second position. Thus, a fitter can decide himself which function of the tool cabinet or tool and gear wagon makes sense for him personally. This can be, for example, drawers in the lower or upper region which, however, offer the possibility of simultaneously employing only a few tools at a time because other tools are also provided in the drawers below it. Thereby, the inconvenient pushing-in of individual drawers and the assurance that an existing locking is cancelled again by the pushed-in drawer before a further drawer is pulled out are eliminated. If a higher overturning moment occurs in tool and gear wagons due to the pulled-out drawers and the tools stored therein, this can be compensated, for example, by the bottom element of the tool and gear wagon being fitted with weights that ensure an increased stability even if several drawers are pulled out, where in an extreme case, all drawers can be pulled out, including the range of tools, without the tool and gear wagon tipping over. If it is a matter of tool cabinets, these can be fixed to the wall to prevent them from tipping over.

The substantial advantage in the storage unit according to the invention is thus that the locking unit can be arrested in two positions, optionally also several positions, by an adjustment element, and such a storage unit can thus be used conventionally with locked drawers, but if required, the locking unit is deactivated and it is thus possible to pull out more than one drawer at a time.

To permit a locking, the telescopic rails are fitted with a blocking element in the rear region which corresponds to the locking unit. The blocking elements are used to vertically shift the locking units and are each mounted in a recess as a guide which is located in the telescopic rails. By a spring, the blocking element is pressed towards the locking elements, that means in the pull-out direction, and pressed into the rear region, as seen from the front, of the recess against the spring force by a pushed-in drawer. If a drawer is pulled out, the spring presses the blocking element in the pull-out direction and thereby between the locking elements so that a locking of the other drawers can be accomplished. The moveability of the blocking element is here determined by the length of the recess and is dimensioned such that a pushing back into an end position is easily possible without reaching the end of the recess, and during the pulling-out of the drawer, there is sufficient moveability so that the blocking element can come between the locking elements due to the spring force. Moreover, the spring-cusioned blocking element causes the drawers to slide into their respective end positions and to be quasi cushioned.

The blocking elements of each drawer, which are mounted in a recess of the telescopic rails, furthermore include a coupling with blocking elements mounted within the telescopic rails which are simultaneously activated in case of an arrest of the externally protruding blocking elements and thereby prevent further drawers from being pulled out. The telescopic rails employed herein are employed in industry in multifarious forms and are thus to be considered as prior art.

The locking unit consists of a U-shaped panel at which vertically movable locking elements are arranged corresponding to the number of drawers. The U-shaped panel here only serves to fasten the locking elements which are fastened, for example by means of two studs or optionally rivets, to the U-shaped panel such that they nevertheless are vertically slidable. This slideability is ensured, for example, by formed oblong holes of the locking elements. The movement of the locking elements is triggered by the blocking element which runs against the locking element and runs against a stop face, so that the drawer cannot be pulled out any further if one drawer has already been pulled out, for example. Otherwise, if no drawer has been pulled out yet, the blocking element causes a vertical movement of the locking elements located above the blocking element to the top by sliding between the locking elements, while the locking elements located underneath the blocking element are blocked. If, for example, a central drawer is pulled out, the locking elements that are located vertically higher are vertically shifted to the top whereby the blocking effect of the limit stop comes into effect. By the blocking of the locking elements, the further blocking elements which are associated with the bottom lower drawers cannot reach between the locking elements so that these drawers are also blocked. The particularity here is that by one blocking element, one or more locking elements are vertically shiftable and thereby activate the catch. To this end, the locking elements are flatly fixed on the basis of the U-shaped panel in a slidable manner by studs or optionally rivets, wherein the locking elements have a vertical moveability due to existing oblong holes.

The U-shaped panel with the locking element forms the basis to perform the locking of the individual drawers, where the present invention provides that by a repositioning of the U-shaped panel, all drawers can be permanently unlocked. There are basically two possibilities for this. The U-shaped panel can be fixed to the body of the storage unit by hinges, and by pivoting the U-shaped panel, the complete locking of all drawers can be deactivated. As an alternative, it is possible for the U-shaped panel to perform a horizontal and vertical movement by a mechanism, so that the blocking elements also disengage from the locking elements and all drawers are released thereby. For example, two U-shaped panels can be used which have different bases and can thus slide into one another. A first U-shaped panel is stationarily connected with the body while the second U-shaped panel is vertically and horizontally movable with respect to the first U-shaped panel via guiding pins and guiding grooves and can be moved into the first U-shaped panel and submerge in it by this movement.

In a further embodiment of the storage units, in particular in the form of a tool cabinet or a tool and gear wagon, the adjustment element consists of a spring-loaded locking pin which can be arrested in several bores, or the adjustment element consists of an internal mechanism which permits, by means of a rotating cylinder lock with a key, an adjustment and arrest of the locking unit from outside. By means of the cylinder lock, the operation of the locking unit for changing the position is substantially facilitated and permits a change of the adjustment at any time. By the lock, the locking can be advantageously only changed by means of a key.

To lock the other drawers after one drawer has already been pulled out, the locking unit is used which consists of the U-shaped panel with a corresponding number of locking elements, depending on how many drawers the tool cabinet or tool and gear wagon has. To this end, it is necessary for the U-shaped panel to be fixed in a certain position. To deactivate the blocking of the other drawers, the U-shaped panel is, in a first embodiment, connected with the body via at least two hinges so as to be movable in a pivoting manner, the hinges having a vertical axis of rotation. Due to the selected construction, it is therefore possible to pivot the U-shaped panel in its vertical arrangement about a vertical axis of rotation. Exclusively by pivoting, it is achieved hereby that the blocking elements do no longer come into engagement with the locking elements and thereby, all drawers can be pulled out one after another. This unlocking is achieved, in a first exemplified embodiment, only and exclusively by pivoting the U-shaped panel because the blocking elements are arranged to be freely movable at this moment.

In order to securely hold the U-shaped panel in the one or in the other position, in a further embodiment of the invention, the U-shaped panel includes a holding bracket for a locking pin preloaded with a spring which engages with a bore of the bottom element of the body with its free end. By means of the locking pin which engages with a bore of the bottom element, at least two positions, optionally also several positions, can be fixed if required. In the most simple case, a first position of the U-shaped panel is fixed by a first bore, and a second position by a second bore, wherein the locking pin is pressed into the existing bore due to the spring preload. By lifting the locking pin, the arrest can be released and thus the U-shaped panel be pivoted.

As an alternative, an arrangement with two U-shaped panels is possible, wherein a first U-shaped panel is connected with the body and a second U-shaped panel is connected with the first U-shaped panel via a guiding groove and guiding rod and is, when a manual force is applied, repositioned vertically and horizontally and submerges into the U-shaped panel fastened to the body, so that the blocking elements are also arranged to be freely movable. Such a repositioning can be effected by a rotary element actuated by a key, for example.

In a further development of the invention, the locking elements have two rounded corners at a longitudinal edge, wherein one rounded corner is fitted with a stop face, and the rounded corners are oriented towards the rear panel of the body after their assembly. The rounded corners here serve as an abutment of the blocking elements which cause, due to their shape and out of their rigid position, a shifting of the locking elements by sliding over the rounding. The blocking elements themselves can only perform a horizontal movement. One of the rounded corners is here fitted with a stop face so that, when the locking elements have reached their end positions, the blocking elements of the other drawers at least partially directly run against the stop faces. As an alternative, the locking elements vertically shifted to the bottom prevent a horizontal movement of the blocking elements.

As an alternative, the locking elements could be caused to rotate by a blocking element, so that the other blocking elements run against a stop face.

In a further embodiment, the tool cabinet or tool and gear wagon has an upper storage tray on which, for example, the tools can be placed temporarily if these are needed successively several times, while other equipment has to be used in the meantime. It is equally possible that a tool and gear wagon has handles formed at least at the narrow sides of the storage tray which permit to pull behind the tool and gear wagon or offer the possibility of driving the tool and gear wagon to a desired position for the respective person by pulling the tool and gear wagon to the required position via the handles.

In a further embodiment of a tool and gear wagon, the narrow sides have a perforated cover or an opening for tool hooks. The narrow sides can be, for example, sheet metal walls which are arranged perpendicularly to the drawers and are part of the body. However, it could also be the rear panel of the tool and gear wagon, for example. The perforated covers or openings for tool hooks will here be individually used to receive particularly large and bulky tool components, in particular special tools, so that these are also conveniently available at any time.

In order to ensure the movability of a tool and gear wagon, the latter is fitted with two fixed rollers and at least one rotationally movable roller, preferably two rotationally movable rollers which are moreover provided with a safety catch. As a rule, the tool and gear wagons always have to be driven to the correct position, and the two fixed rollers and one or two movable rollers are used for this to facilitate the handling for the person who needs the tools.

The present invention is characterized in that a well-known tool cabinet or tool and gear wagon offers the possibilities, apart from a locking of the further drawers, when one drawer is pulled out, of blocking the other ones, where it is not relevant which one of the drawers is pulled out first. The tool cabinet or tool and gear wagon according to the invention also offers the possibility to not only pull out one but several drawers, optionally all drawers, so that the tools are always conveniently available when they are needed. To this end, it is possible to pivot the locking unit by an adjustment element into a position in which existing blocking elements are disengaged from the locking elements.

The invention will be further illustrated more in detail with reference to the figures in the form of a tool and gear wagon by way of example.

DETAILED DESCRIPTION OF THE PREFERRED EMBODIMENTS

Figure 1:
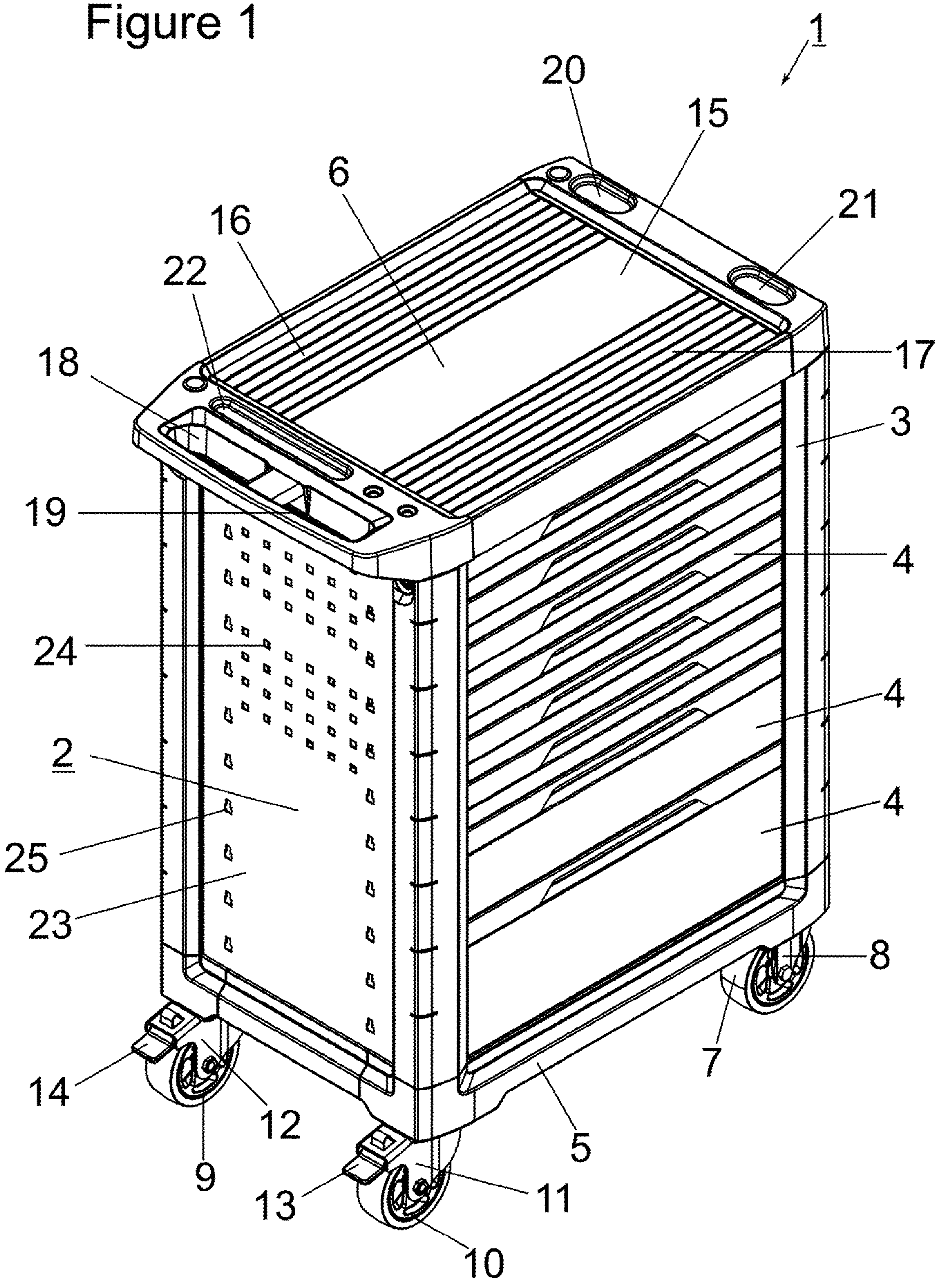
FIG. 1 shows a tool and gear wagon in a perspective view.

FIG. 1 shows, in a perspective view, a tool and gear wagon 1 as it is employed in this form very often. The tool and gear wagon 1 has a body 2 with a front 3 in which a plurality of drawers 4 are arranged so that they can be pulled out. The drawers 4 here have different heights. In the rear, non-visible region of the tool and gear wagon 1, there is a rear panel. The body 2 of the tool and gear wagon 1 is completed in its lower region by a bottom element 5, and by a storage tray 6. The bottom element 5 is fitted with two stationary rollers 7 which are connected with the bottom element via a roller holder 8. The tool and gear wagon 1 furthermore has two rotationally movable rollers 9, 10 which are each connected with the bottom element 5 via one roller holder 11, 12. The roller holders 11, 12 are furthermore provided with a safety catch 13, 14, so that a local fixing of the position of the tool and gear wagon is possible.

The storage tray 6 has a cavity 15 in its central region which is laterally restricted by cavity-like indentations 16, 17. The complete storage tray 6 serves to place tools, in particular special tools, which have been removed from one of the drawers 4 and have to be placed down temporarily before they are used again. Otherwise, the non-depicted tools are returned to the drawers 4. To improve the handling of the tool and gear wagon, it is possible to pull the wagon, after the safety catches 13, 14 have been released via the existing grip hollows 18, 19, to a desired position and then actuate the safety catches 13, 14 again. On the opposite side of the grip hollows 18, 19, indentations 20, 21 are worked into the storage tray 6 which offer the possibility of placing screws or the like, for example. For the same reason, there also is an oblong indentation 22 behind the grip hollows.

The side walls 23 of the body 2 are here fitted with a number of different passages 24, 25 which permit to engage hooks and thus further tool parts.

In this representation, the function of the drawers 4 of the tool and gear wagon 1 is not yet obvious, but is illustrated by the following figures.

Figure 2:
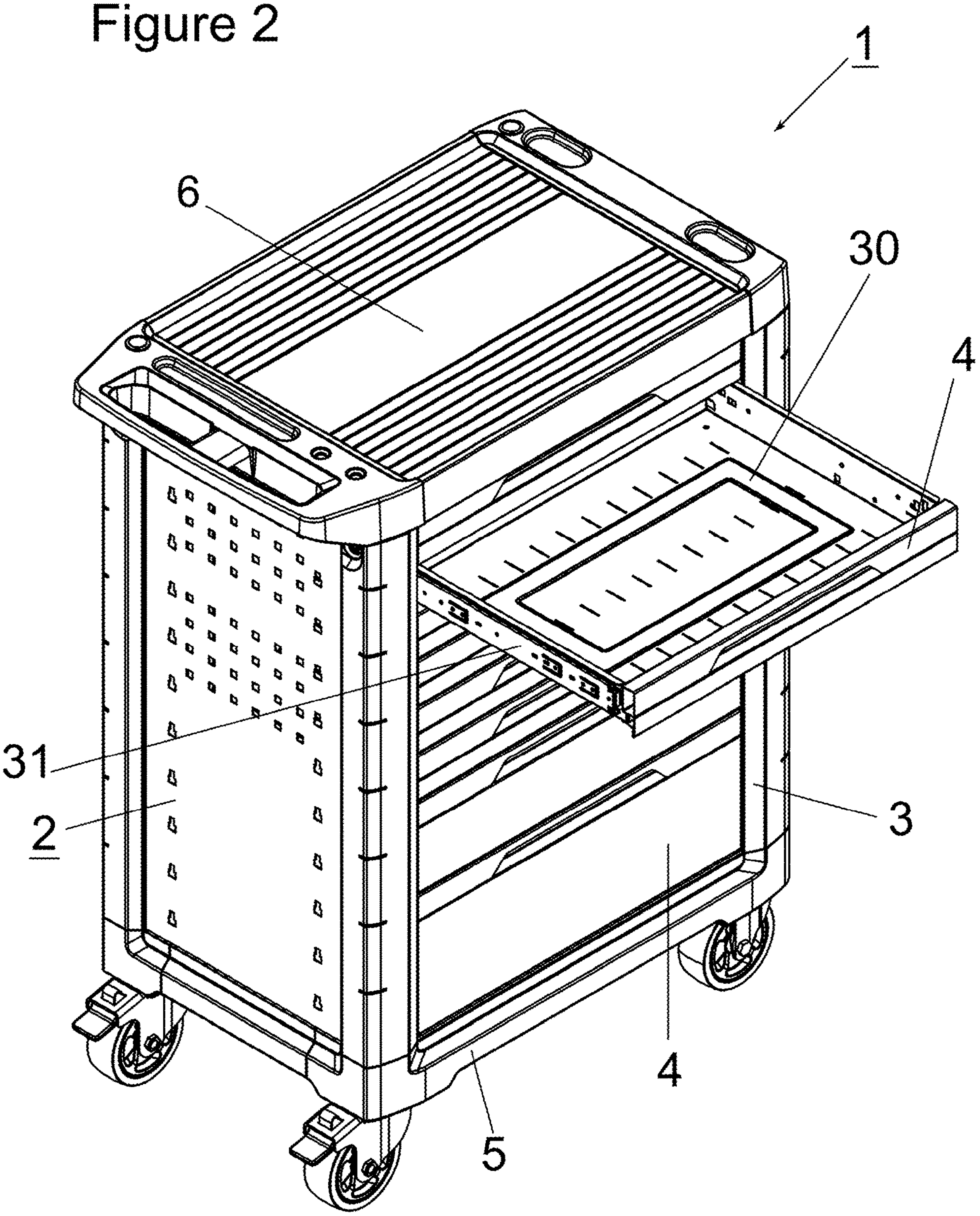
FIG. 2 shows the tool and gear wagon according to FIG. 1 with a pulled-out drawer in a perspective view.

FIG. 2 shows, in a perspective view, the tool and gear wagon 1 already known from FIG. 1 with the body 2, bottom element 5, front 3, storage tray 6, and the drawers 4 one of which is pulled out. The drawer 4 here shows a division option by provided insets 30 which are exchangeable. The drawer 4 is here supported via telescopic rails 31 which are arranged on both sides of the drawer 4 and are engaged in a fixed guide within the body 2. Each one of the drawers 4 is designed similarly and they have different heights, but in any case, they have one pair of pull-out hinges 31 designed for higher loads.

Figure 3:
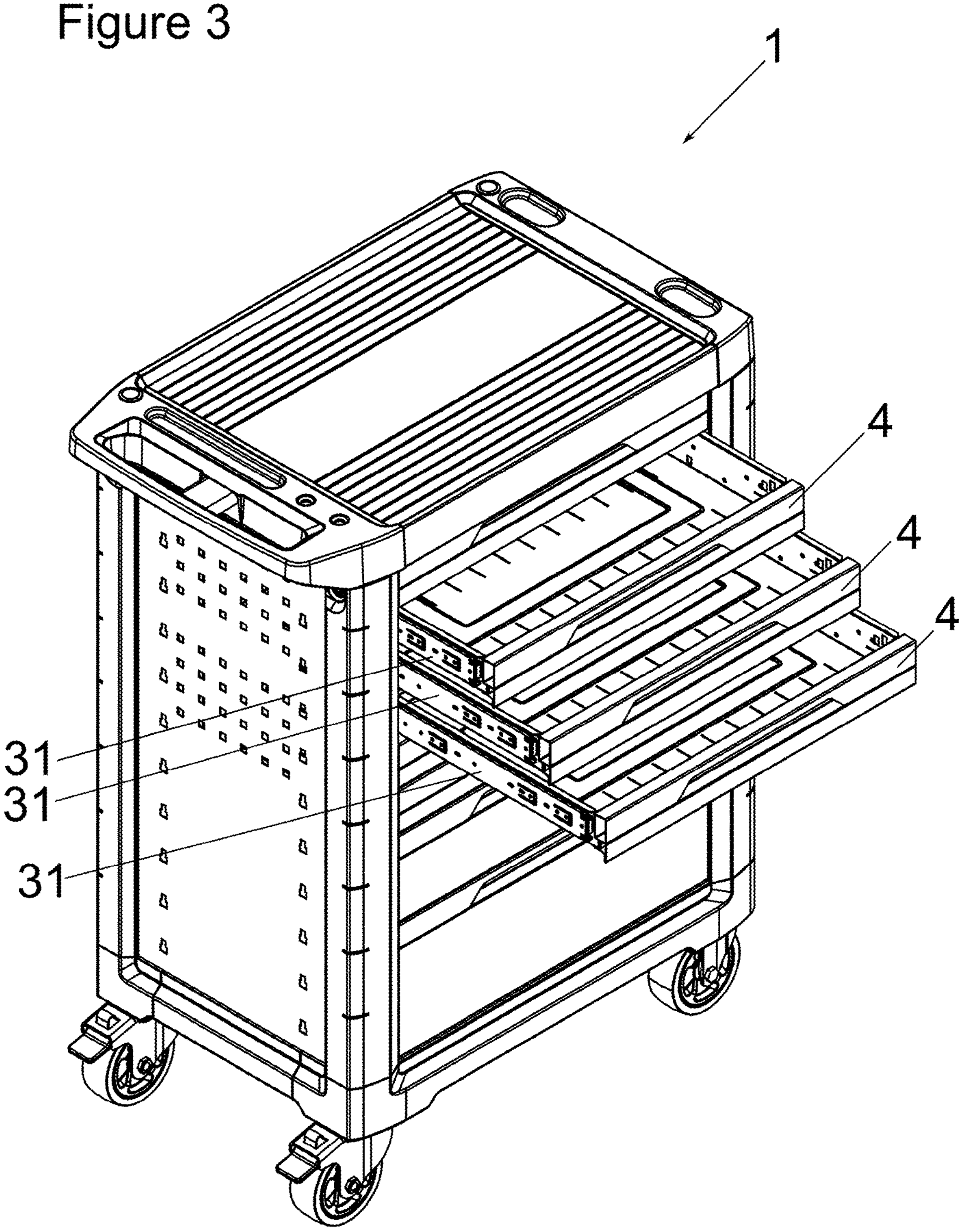
FIG. 3 shows the tool and gear wagon according to FIG. 1 with three pulled-out drawers.

FIG. 3 shows, in a perspective view, the tool and gear wagon 1 according to FIG. 1, in this case, altogether three drawers 4 being pulled out from the tool and gear wagon 1. Each one of the drawers 4 is provided with a pair of telescopic rails 31 which are insofar stable as a secure support of each individual drawer 4 within the body is ensured. Otherwise, it corresponds to the further equipment of the tool and gear wagon 1 according to FIG. 1.

Figure 4:
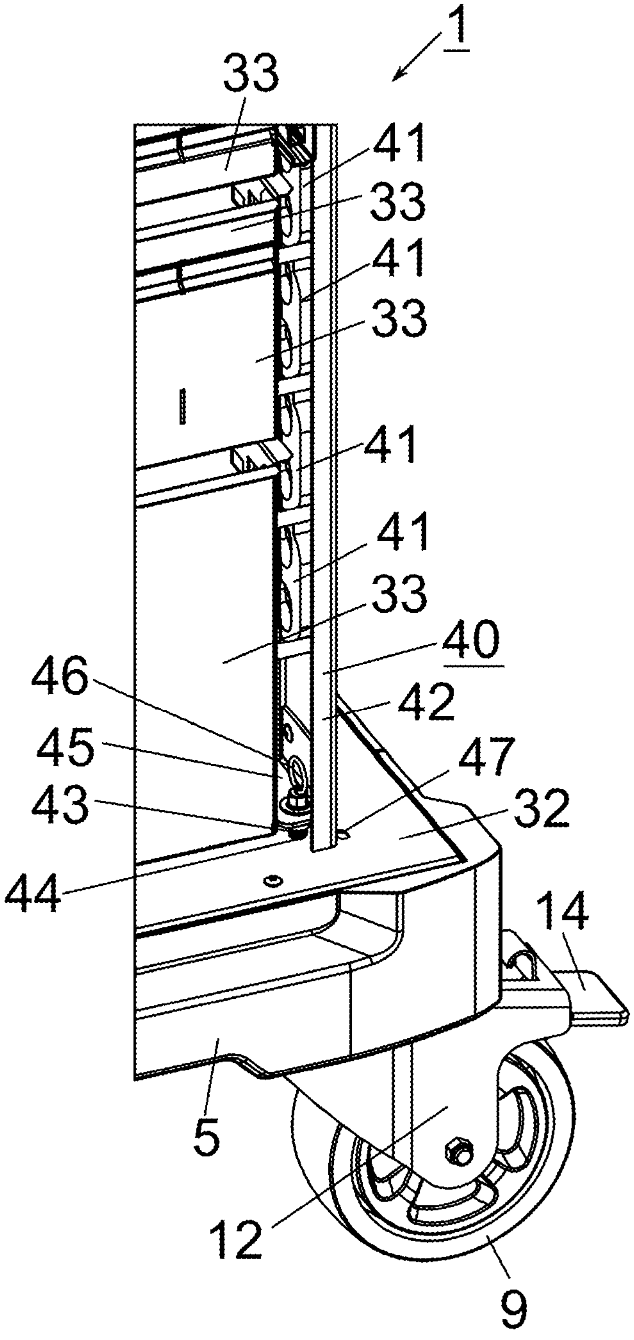
FIG. 4 shows the locking units for the respective drawers in an activated position in a perspective partial view.

FIG. 4 shows, in a perspective partial view, the rear region of the tool and gear wagon 1 without the rear panel, i. e. a corner region with a movable roller 9 which is received in a roller holder 12. The movable roller 9 with the roller holder 12 is fixed to the bottom element 5, only a portion of which can be seen. A bottom panel 32 is located on the bottom element 5 on which the body of the tool and gear wagon 1 is furthermore erected. Only a rear panel 33 of the drawers can be seen, corresponding to the height of the respective drawers 4. From this view, the locking unit 40 can be furthermore seen which has individual locking elements 41 corresponding to the existing number of drawers. The locking elements 41 are fastened to a panel 42 bent in a U-shape such that a vertical shifting of the individual locking elements 41 to the top is possible. The U-shaped panel 42 is held in a corresponding position by a locking pin 43 which is seated in a bore 44, the locking pin 43 being received in a bracket 45 and pressed into the bore 44 preloaded by a spring. For unlocking, the locking pin 43 is provided with a ring 46 in the upper region which permits a facilitated pulling-out of the locking pin 43 from the bore 44. The locking pin 43 permits an arrest of the U-shaped panel 43 in a certain position according to FIG. 4 in a position in which a mutual locking of the drawers 4 is possible. A second bore 47 is used to also arrest the locking pin 43 when the U-shaped panel 42 is pivoted, namely in a further position in which the individual drawers 4 can no longer be mutually locked. This position is illustrated in FIG. 5.

Figure 5:
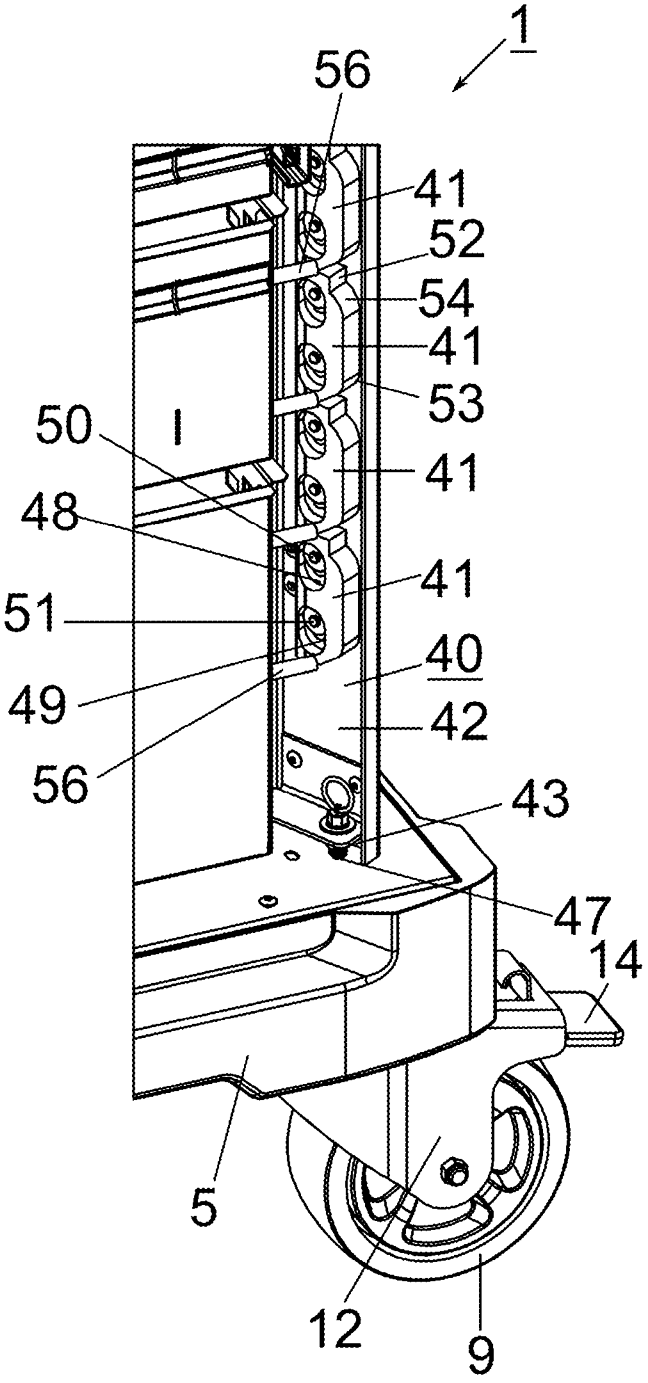
FIG. 5 shows the locking unit in a deactivated position in a perspective partial view.

FIG. 5 shows, in a perspective partial view of the tool and gear wagon 1, the locking unit 40 with a U-shaped panel 42 in which the individual locking elements 41 are fastened to the base of the plate 42. The locking elements 41 are fastened to the U-shaped panel 42 corresponding to the number of drawers such that a vertical shifting of each locking element 41 is possible. The shiftability is here realised by each locking element 41 being fitted with two oblong holes 48, 49, in which one fastening bolt 50, 51 is inserted each, where the fastening bolts 50, 51 can be a stud, but also a rivet, and one washer each prevents one locking unit 41 from falling down, but ensures a vertical shifting of each locking unit 41. Each locking element 41 has a stop face 52 and, at the longitudinal side, a rounding 53, 54. The roundings 53, 54 serve to better guide the blocking elements 56 as they are arranged at each drawer 4 in the rear region. The blocking elements 56 here grip between the individual locking elements 41 by sliding down at the existing rounding 52, 53 and cause a shifting in the vertical direction to the top. When the locking unit 40 has assumed a first position, as in FIG. 4, the drawers 4 are lockable such that, when one drawer 4 is pulled out, the other drawers are blocked. This is a first position of the locking pin 43 in a bore 44, while FIG. 5 shows a second position of the locking pin 43 in a bore 47 where the complete locking unit 40 has been pivoted about a vertical axis and thereby, the locking units 41 are no longer engaged with respect to the blocking elements 56. In this manner, it is thus realised that the drawers 4, in an individual case even all drawers, can be pulled out independently since there is no more mutual locking. The locking pin 43 and the bores 44, 47 here form the adjustment element.

Figure 6:
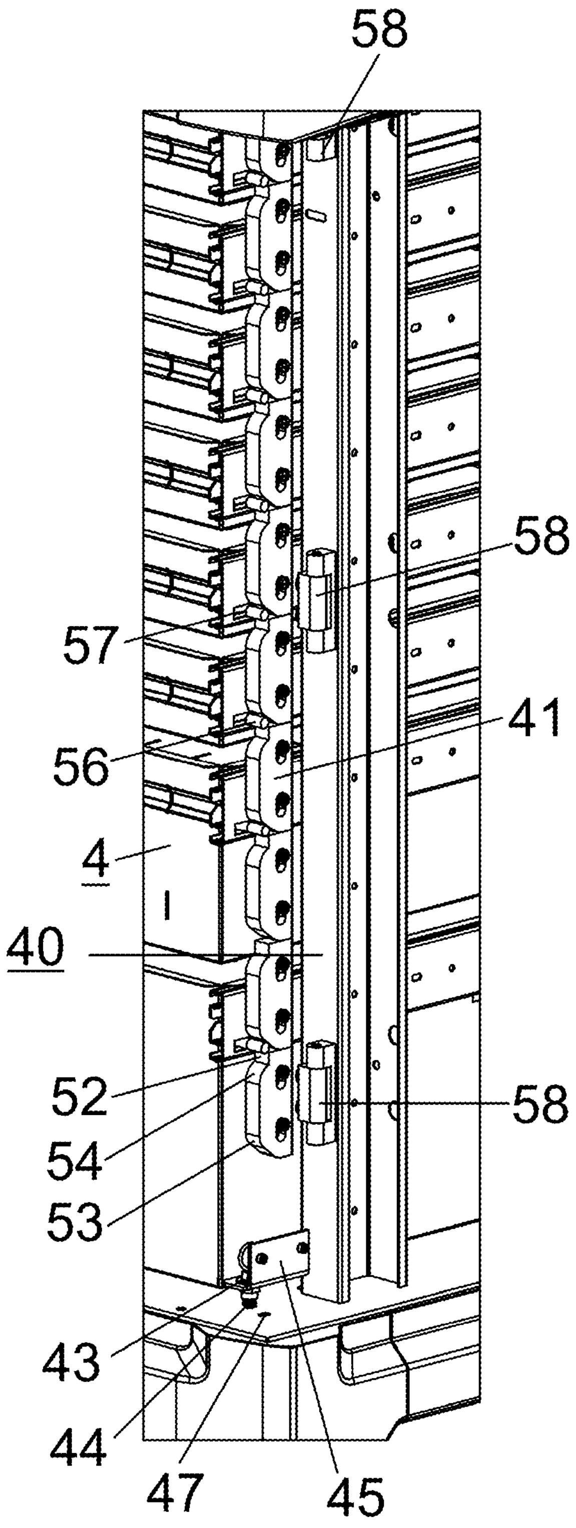
FIG. 6 shows the locking unit for the existing drawers with locking elements in an activated basic position in a perspective partial view.

FIG. 6 shows, in a perspective partial view, the tool and gear wagon 1 from another angle of view. In this case, the corner region of the locking unit 41 is shown again, however, the U-shaped panel 42 is omitted so that the position of the individual locking elements 41 with respect to the blocking elements 56 becomes clear. In the lower region, a bracket 45 is provided which supports the locking pin 43 which engages with a bore 44 or 47. In FIG. 6, the locking pin 43 engages with the bore 44 and thus represents the position in which there is a mutual locking of the individual drawers 4. Each telescopic rail 31 is laterally fitted with a blocking element 56 which is mounted in a longitudinal recess 57 in a slidable manner, wherein the blocking element 56 has a spring preload, for example to permit a dampening when the drawers 4 are pushed in or pulled out and to press the blocking element 56 against the locking elements 41 by the spring force.

The blocking elements 56 protruding to the outside are furthermore coupled with an internal blocking element which is part of the telescopic rail 31. In case a movement of the outer blocking element 56 is not possible due to the locking elements 41, it is here simultaneously prevented that further drawers 4 can be pulled out.

In this view, three hinges 58 are visible which permit a pivoting of the U-shaped panel 42. The pivoting axis is here in a vertical arrangement. The hinges 58 are also only required to bring the plate 42 to a position in which a release of the blocking element 56 is given. From this view, the shape of the locking elements 41 with two roundings 53, 54 and one stop face 52 each furthermore becomes clear again. The functioning of the locking elements 41 is as follows. In the normal position, the blocking elements 56 are in contact with respectively adjacent locking elements 41 and abut against the rounding 54, so that, when a drawer is pulled out, the blocking element 56 is guided along the rounding by spring force and slides between the two adjacent locking elements 41. Simultaneously, the upper and lower locking elements 41 are pushed apart by a vertical movement of the upper locking elements 41 to an elevated position, so that further blocking elements 55 run against the stop face 52. The lower locking elements 41 are, in contrast, arrested in this position, so that no moveability is given in the vertical direction. This simultaneously causes that the blocking elements 56 of the lower drawers 4 are not able to come between the locking elements 41, and thus, there also is a fixed arrest of the lower drawers 4.

Only when the respective drawer 4 which has triggered the locking has been completely pushed in again, the locking elements 41 are unlocked and can move again in the vertical direction, whereby a release of another blocking element 56 is possible.

Figure 7:
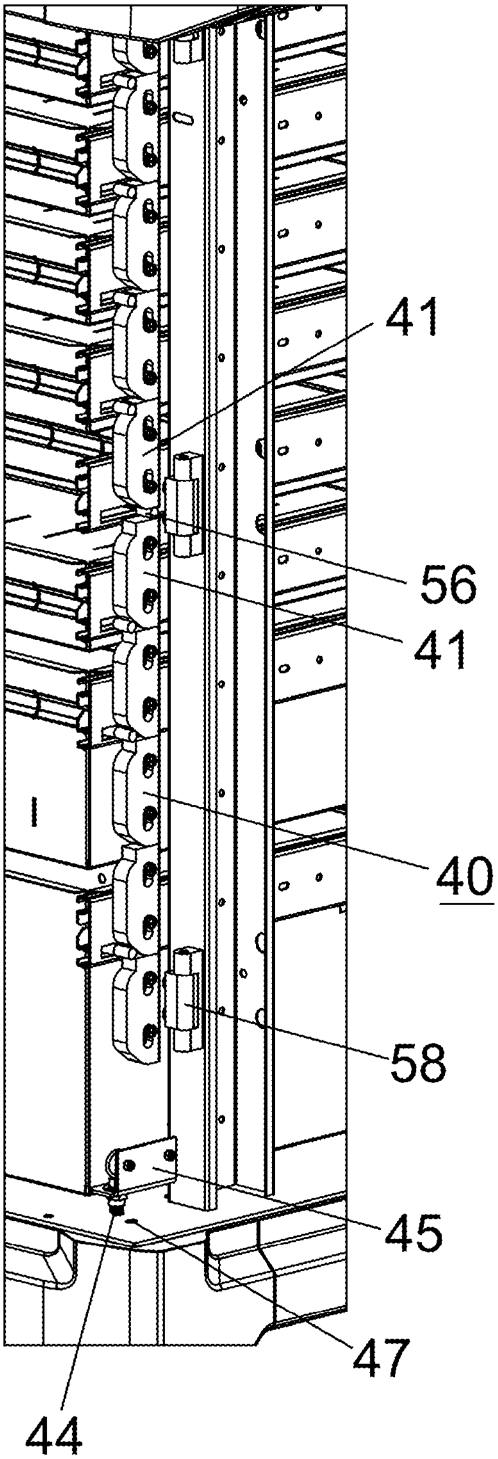
FIG. 7 shows the locking unit for the existing drawers after a central drawer has been pulled out with activated locking elements in a perspective partial view.

FIG. 7 substantially shows, in a perspective partial view, the arrangement of the locking unit 40, as it is known from FIG. 6, with one difference being that one drawer 4 has been pulled out, so that the respective blocking element 56 has come between the two adjacent locking elements 41. As a consequence, the blocking elements 41 located above it were moved vertically to the top, and the blocking elements 41 located below it were arrested, so that no further shifting is possible. Thereby, a complete blocking of all other drawers is given. Only when the respective drawer 4 has been pushed in again and the blocking element 56 steps back behind the locking elements 41, a blocking by another blocking element 56 could be triggered again. It has to be considered here that the locking pin 43 is located in the bore 44, and thereby, the locking possibility is activated. The second bore 47 here symbolises a second position in which the complete locking unit 44 has been pivoted with respect to the drawers 4 and thereby, the blocking elements 56 are disengaged from the locking elements 41. In this position, it is thus possible that all drawers 4 are pulled out one after the other without there being any mutual locking.

Figure 8:
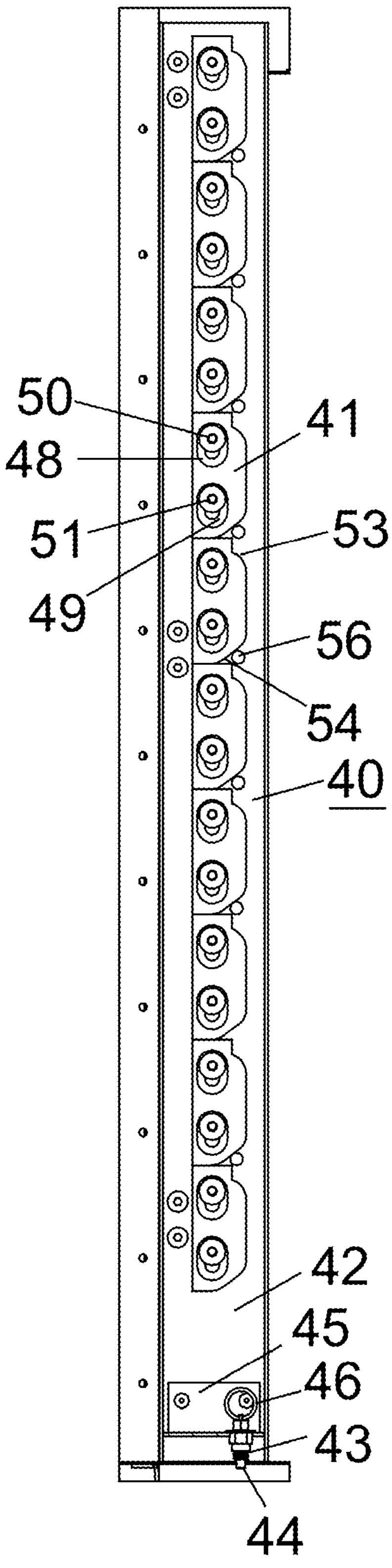
FIG. 8 shows a plan view onto the locking unit in a basic position.
Figure 9:
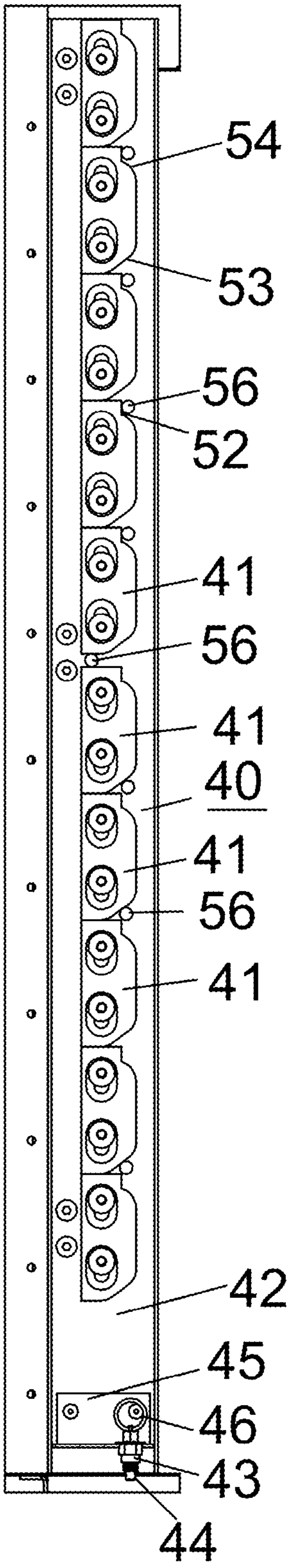
FIG. 9 shows a plan view onto the locking unit with a released blocking.

The situation of the locking elements 41 and locking elements 56 is here obvious again from FIGS. 8 and 9.

FIG. 8 shows, in a plan view, the locking unit 40, consisting of the U-shaped panel 42 and several locking elements 41 which are connected with the U-shaped panel 42 via connection elements 50, 51 in such a way that the locking elements 41 are all shiftable to the top in the vertical direction. To this end, the locking elements 41 have an oblong hole 48, 49 which allows the vertical movement. At the U-shaped panel 42, the locking pin 43 is fastened via a bracket 45, wherein the locking pin 43 engages in a bore 44 and ensures a first locking position of the locking unit 40. By pulling on the ring 46 of the locking pin 43, it can be pulled out of the bore 44 and be inserted into a further bore not visible in this view which permits an unlocking of all drawers 4.

FIG. 8 here shows the basic position of all drawers 4 which is characterised in that the blocking elements 56 are arranged in the transition region from one locking element 41 to the next one and abut against a rounding 54. When one drawer 4 is pulled out, the blocking element 56 is thus moved in the pull-out direction of the drawer whereby the blocking element 56 slides between two adjacent locking elements 41 along the rounding 54. Due to this, the further locking elements 41 which are located underneath the moved blocking element 56 are arrested in their movement, and no shifting to the top is possible, while the locking elements 41 located above are pushed to the top, also resulting in an arrest. With the movement of the upper locking elements 41, the further blocking elements 56 reach the stop face 52, so that the drawers 4 located above can no longer be pulled out. This blocking is illustrated again in FIG. 9.

FIG. 9 shows, in a plan view, the locking unit 40 in a position in which a central drawer 4 has been pulled out. This is illustrated by the corresponding blocking element 56 having come to lie between two adjacent locking elements 41. The locking elements 41 located above the blocking element 56 have been shifted to the top so that further blocking elements 56 abut against the stop face 52, and the other drawers 4 are blocked. The lower blocking elements 56 are in contrast arrested in such a way that due to the inflexibility of adjacent locking elements 41, a sliding in-between the blocking elements 56 is not possible, so that the lower drawers 4 are also arrested. Only after the corresponding drawer 4 has been pushed in, this locking is released again, and alternatively, another drawer 4 can be pulled out.

Figure 10:
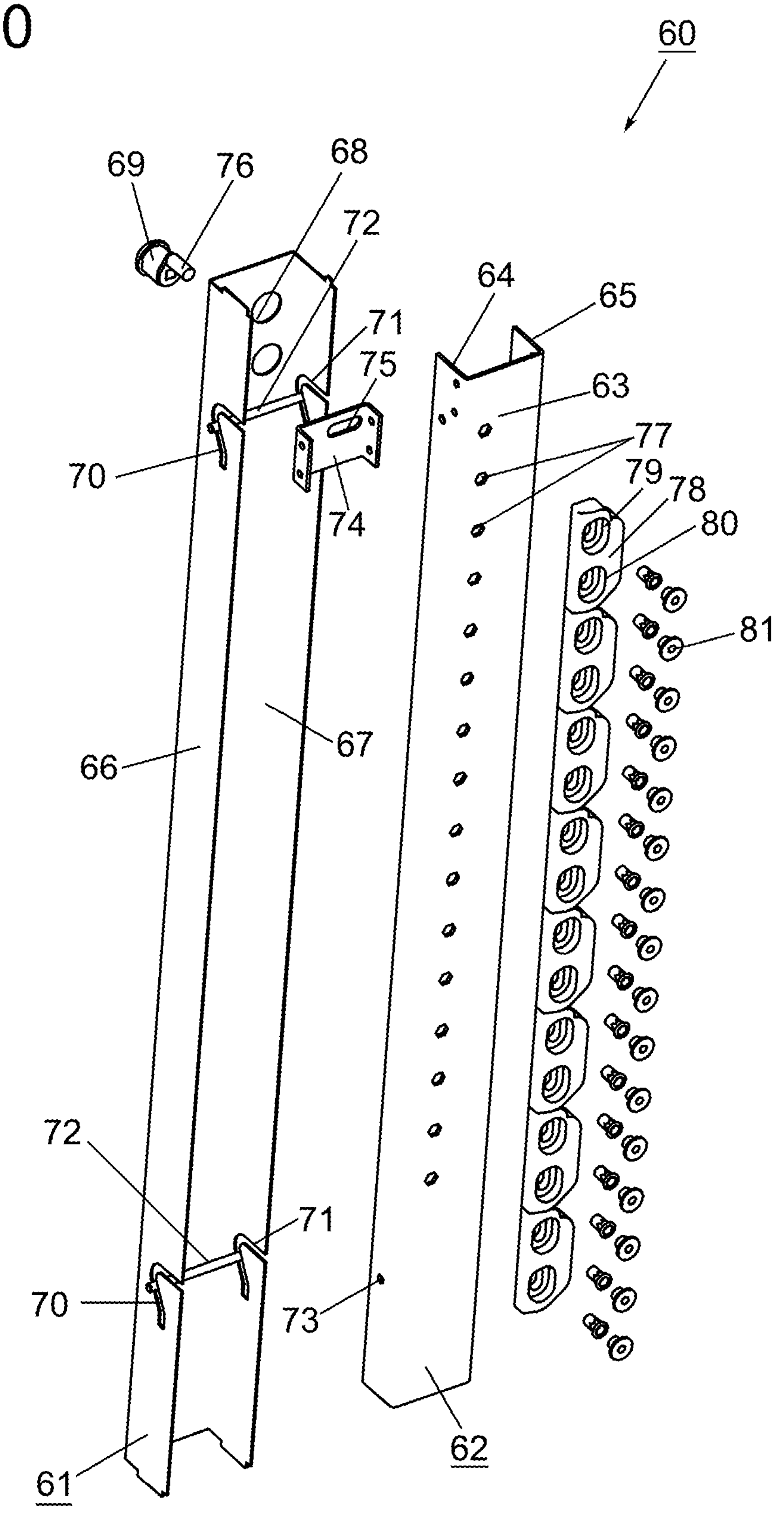
FIG. 10 shows an alternative solution for a locking unit in an exploded view.

FIG. 10 shows, in an exploded view, a further embodiment of a locking unit 60. This locking unit 60 consists of a first U-shaped panel 61 and a second U-shaped panel 42. The base 63 of the second U-shaped panel 62 has a reduced dimension, so that the U-shaped panel 62 can submerge with its outer legs 64, 65 into the first U-shaped panel 61 with its legs 66, 67. The first U-shaped panel 61 has, on one end, at least one bore 68 which is provided for receiving an adjustment element 69. There are furthermore guiding slots 70, 71 in the two legs 66, 67 which are opposed to each other and extend in parallel in the legs 66, 67 and are formed both at the upper and the lower ends. The guiding slots 70, 71 serve to receive two guiding rods 72 arranged between the legs 66, 67. The guiding rods 72 are movably arranged in the guiding slots and connected with the second U-shaped panel 62 via bores 73. Furthermore, a U-shaped angle section 74 is screwed to the second U-shaped panel 62, the angle section 74 including an oblong hole 75 into which the adjustment element 69 engages with a dog 76. The angle section 74 is firmly connected with the second U-shaped panel 62 so that during a rotation of the adjustment element 69 via the dog 76, the angle section 74 is vertically moved together with the second U-shaped panel 62. During a movement, a horizontal movement of the second U-shaped panel 62 within the first U-shaped panel 61, which is stationarily connected with a non-depicted body of the storage container, is simultaneously effected via the guiding rods 72 and guiding slots 70.

The second U-shaped panel 62 is furthermore fitted with a plurality of bores 77 which serve to fasten the locking elements 78. The locking elements 78 include oblong holes 79, 80 and are fixed on the second U-shaped panel 62 with screws 81 such that a vertical moveability is given.

The locking elements 78 have the same function as in the first embodiment to either lock the blocking elements or offer the option of pressing them between the individual locking elements 78 and thus cause a blocking of the other drawers.

By the vertical and horizontal repositioning of the second U-shaped panel 62 with respect to the non-depicted blocking elements, it is possible to cancel all blocking functions, so that, according to the invention, all drawers can be pulled out from the storage unit, in particular the tool and gear wagon.

Figure 11A:
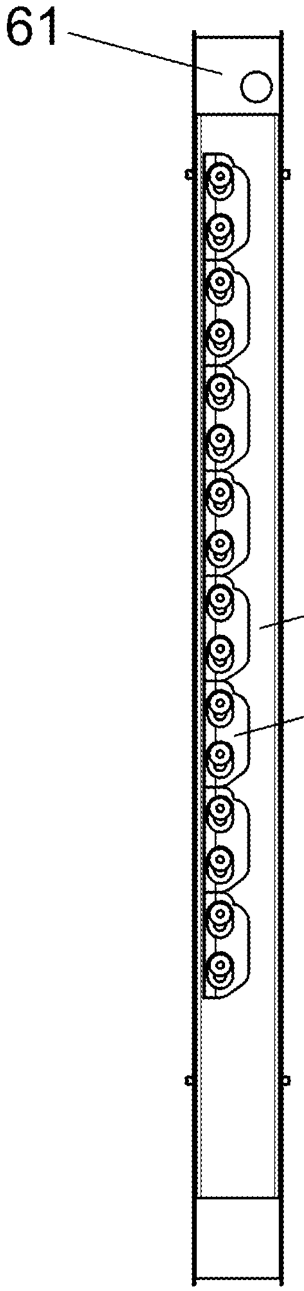
FIG. 11A shows the locking unit according to FIG. 10 after its assembly in a first view.
Figure 11B:
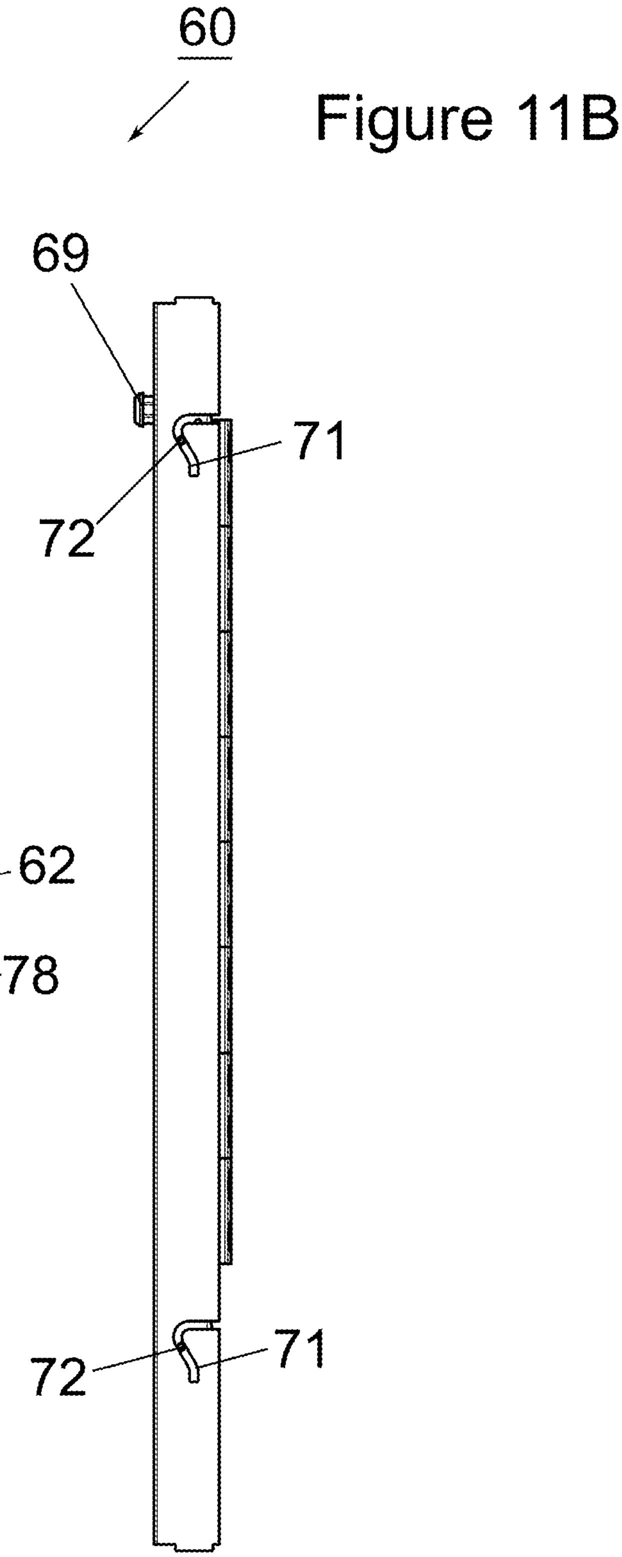
FIG. 11B shows the locking unit according to FIG. 10 after its assembly in a second view.

FIGS. 11A and 11B show in two views the mounted locking unit 60 with a first U-shaped panel 61 and a second U-shaped panel 62 which is provided for receiving the locking elements 78. It is here obvious from the side view of the locking unit 60 that, via the guiding rod 72 and the guiding slots 71, in case of a rotary motion of the adjustment element 69, a vertical and horizontal movement is caused due to the course of the guiding slots 71 to disengage all locking elements 78, if need be.

Figure 12:
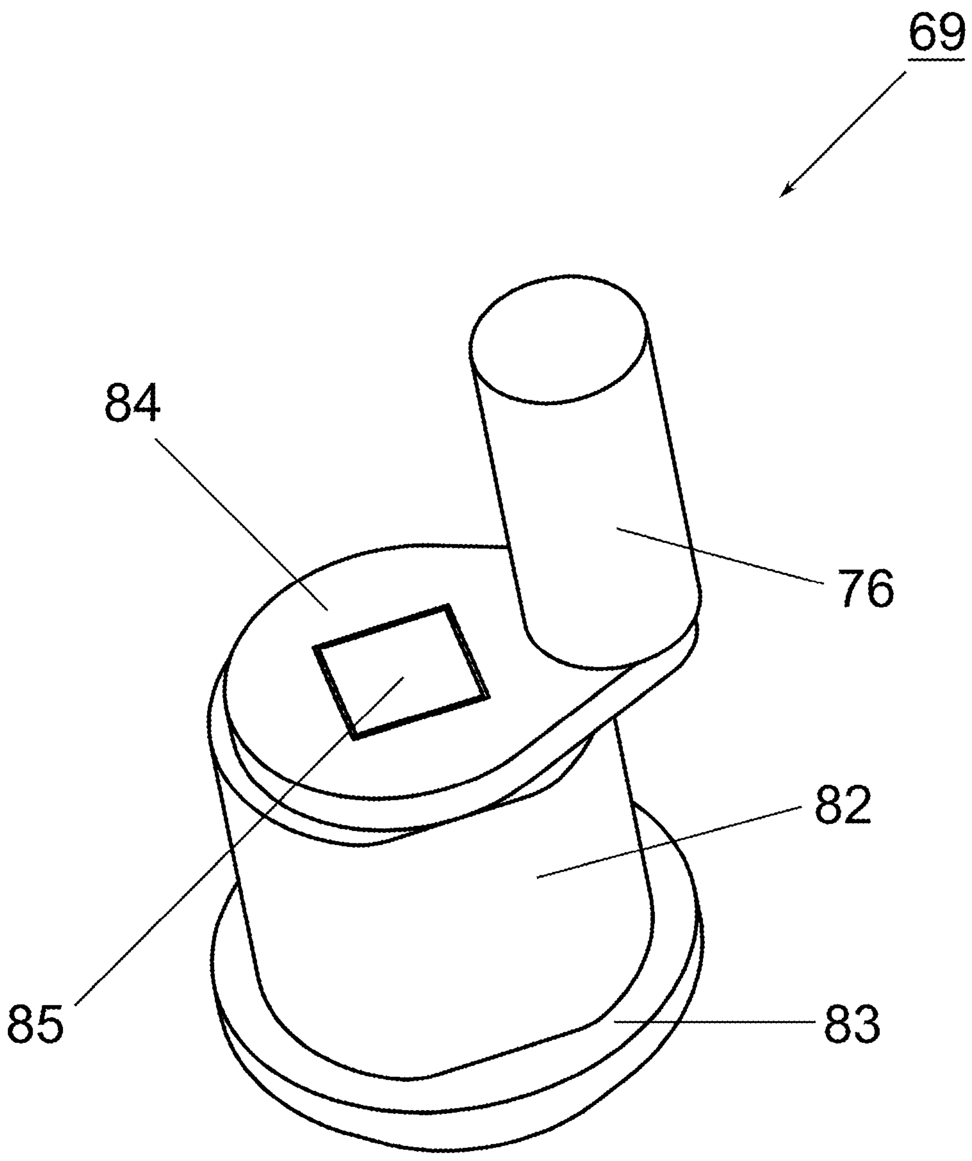
FIG. 12 shows an adjustment element for the alternative embodiment of the locking unit in a perspective view.

FIG. 12 shows, in a perspective view, an adjustment element 69 as it is used in the second variant of the embodiment of the locking unit 60. The adjustment element 69 consists of a central cylinder section 82 with a flanged collar 83 which offers the option of anchoring the adjustment element 69 in the first U-shaped panel 61. In the rear region, a connection disc 84 is provided which has an eccentrically arranged dog 76. The connection disc 84 is connected to the cylinder section 82 via a corresponding threaded joint 85. Via the dog 76 which engages with an oblong hole 75 of the angle section 74, the movement of the second U-shaped panel 62 is effected.

The locking unit 40, 60 described for a tool and gear wagon 1 can also be used in a stationary tool cabinet, where other materials can be employed in some cases.

LIST OF REFERENCE NUMERALS

| | |
|---|---|
| 1 | tool and gear wagon |
| 2 | body |
| 3 | front |
| 4 | drawer |

-continued

| LIST OF REFERENCE NUMERALS | |
|---|---|
| 5 | bottom element |
| 6 | storage tray |
| 7 | roller |
| 8 | roller holder |
| 9 | roller |
| 10 | roller |
| 11 | roller holder |
| 12 | roller holder |
| 13 | safety catch |
| 14 | safety catch |
| 15 | cavity |
| 16 | indentation |
| 17 | indentation |
| 18 | grip hollow |
| 19 | grip hollow |
| 20 | indentation |
| 21 | indentation |
| 22 | indentation |
| 23 | side wall |
| 24 | opening |
| 25 | opening |
| 30 | inset |
| 31 | telescopic rail |
| 32 | bottom panel |
| 33 | rear panel |
| 40 | locking unit |
| 41 | locking element |
| 42 | panel |
| 43 | locking pin |
| 44 | bore |
| 45 | bracket |
| 46 | ring |
| 47 | bore |
| 48 | oblong hole |
| 49 | oblong hole |
| 50 | fastening bolt |
| 51 | fastening bolt |
| 52 | stop face |
| 53 | rounding |
| 54 | rounding |
| 56 | blocking element |
| 57 | longitudinal recess |
| 58 | hinge |
| 60 | locking unit |
| 61 | panel |
| 62 | panel |
| 63 | base |
| 64 | leg |
| 65 | leg |
| 66 | leg |
| 67 | leg |
| 68 | bore |
| 69 | adjustment element |
| 70 | guiding slot |
| 71 | guiding slot |
| 72 | guiding rod |
| 73 | bore |
| 74 | angle section |
| 75 | oblong hole |
| 76 | dog |
| 77 | bore |
| 78 | locking element |
| 79 | oblong hole |
| 80 | oblong hole |
| 81 | screw |
| 82 | cylinder section |
| 83 | flanged collar |
| 84 | connection disd |
| 85 | threaded joint |

The invention claimed is:

1. Storage unit for storing tools, comprising at least one body (2) with several pull-out drawers (4) which can be arrested, via at least one locking unit (40, 60), such that when any one of the drawers (4) is pulled out, the other drawers (4) are blocked, wherein the at least one locking unit (40, 60) has a single mechanical adjustment element (69) which switches between the function of locking in a first position and the release of all drawers (4) in a second position, allowing more than one drawer to be completely pulled out at a time in the second position, wherein locking elements (41) are arranged so to be vertically movable on a U-shaped panel (42), and wherein the U-shaped panel (42) is connected with the at least one body (2) via at least two hinges (58) so as to be movable in a pivoting manner, wherein the hinges (58) include a vertical axis of rotation.

2. Storage unit according to claim 1,
characterized in that
telescopic rails (31) are fitted with a blocking element (56) in a rear region which corresponds with the locking unit (40, 60).

3. Storage unit according to claim 1,
characterized in that
a blocking element (56) is movable to and fro in the pull-out direction in a longitudinal recess (57) of a telescopic rail (31), wherein the blocking element (56) is movable into an end position by the drawer (4).

4. Storage unit according to claim 1,
characterized in that
the locking unit (40) consists of a U-shaped panel (42) at which vertically movable locking elements (41, 78) are arranged.

5. Storage unit according to claim 1,
characterized in that
the locking unit (60) consists of two U-shaped panels (61, 62) of which a first U-shaped panel (61) is stationarily connected with the body (2), and a second U-shaped panel (62) can be moved into the first U-shaped panel (61) and submerge in it in a vertically and horizontally moving manner via guiding rods (72) and guiding slots (70, 71) of the first U-shaped panel (61), wherein vertically movable locking elements (78) corresponding to the number of drawers are arranged on the second U-shaped panel (62).

6. Storage unit according to claim 1,
characterized in that
locking elements (41, 78) include a stop face (52) for blocking elements (56), and/or one or more locking elements (41, 78) are vertically shiftable by the blocking elements (56), and/or the locking elements (41, 78) are flatly fixed on a base (63) of a U-shaped panel (42, 62) in a slidable manner.

7. Storage unit according to claim 1,
characterized in that
locking elements (41, 78) have two rounded corners at a longitudinal edge, wherein one rounded corner is fitted with a stop face (52), and wherein the rounded corners are oriented towards a rear panel of the body (2) after assembly.

8. Storage unit according to claim 1,
characterized in that
a U-shaped panel (42) has a bracket (45) for a locking pin (43) which engages with its free end with a bore (44, 47) of a bottom element (5) of the body (2), and/or at least two bores (44, 47) of the bottom element (5) provide an arrest of the U-shaped panel (42) in at least one first and one second position.

9. Storage unit according to claim 1,
characterized in that
the adjustment element consists of a spring-loaded locking pin (43) which can be arrested in several borers (44, 68), or the adjustment element (69) consists of an adjustable and arrestable mechanism which provides, by means of a rotating cylinder block with a key, an adjustment and arrest of the locking unit (40, 60) from the outside.

10. Storage unit according to claim 1,
characterized in that
tool cabinets have an upper storage tray (6), and/or a tool and gear wagon 1 includes handles or grip hollows (18, 19) at a storage tray (6) formed at least at narrow sides.

11. Storage unit according to claim 1,
characterized in that
narrow sides of a tool cabinet have a perforated cover or openings for tool hooks, and/or a tool and gear wagon (1) is fitted with two fixed rollers (7) and at least one rotationally movable roller (9, 10) which moreover is provided with a safety catch (13, 14).

* * * * *